(12) United States Patent
Hermey

(10) Patent No.: US 7,497,072 B2
(45) Date of Patent: Mar. 3, 2009

(54) ENERGY GUIDING CHAIN

(75) Inventor: Andreas Hermey, Hennef (DE)

(73) Assignee: Igus GmbH, Cologne (DE)

( * ) Notice: Subject to any disclaimer, the term of this patent is extended or adjusted under 35 U.S.C. 154(b) by 0 days.

(21) Appl. No.: 11/738,164

(22) Filed: Apr. 20, 2007

(65) Prior Publication Data

US 2007/0246600 A1 Oct. 25, 2007

(30) Foreign Application Priority Data

Apr. 21, 2006 (DE) .................. 20 2006 006 645 U

(51) Int. Cl.
*F16G 13/00* (2006.01)
*F16L 3/00* (2006.01)

(52) U.S. Cl. ......................... 59/78.1; 248/49

(58) Field of Classification Search .................. 59/78.1; 248/49, 51

See application file for complete search history.

(56) References Cited

U.S. PATENT DOCUMENTS

| 3,284,036 | A | 11/1966 | Nansel |
| 3,716,986 | A | 2/1973 | Cork et al. |
| 3,779,003 | A | 12/1973 | Boissevain et al. |
| 4,373,324 | A | 2/1983 | Janos |
| 4,392,344 | A | 7/1983 | Gordon et al. |
| 6,371,876 | B1 | 4/2002 | Blase |
| 6,425,238 | B1 | 7/2002 | Blase |
| 6,612,104 | B2 | 9/2003 | Blase |
| 6,997,412 | B2 | 2/2006 | Komiya |
| 2002/0056336 | A1 | 5/2002 | Blase |
| 2002/0124548 | A1 | 9/2002 | Blase |
| 2007/0245705 | A1 | 10/2007 | Hermey |

FOREIGN PATENT DOCUMENTS

| DE | 26 56 638 | 6/1978 |
| DE | 4313075 | 11/1994 |
| DE | 19715531 | 10/1998 |
| DE | 19919076 | 11/2000 |
| DE | 103 43 263 | 5/2005 |
| DE | 20 2006 006 638 | 6/2006 |
| DE | 20 2006 006 645 | 7/2006 |
| EP | 0 047 168 | 3/1982 |

(Continued)

OTHER PUBLICATIONS

German Search Report dated Aug. 14, 2007 received in corresponding German Application No. 20 2006 006 645.4, 4 pgs.

(Continued)

*Primary Examiner*—David B Jones
(74) *Attorney, Agent, or Firm*—Grossman Tucker Perreault & Pfleger, PLLC

(57) ABSTRACT

On an energy guiding chain for guiding hoses, cables and the like, where the upper strand lies on the lower strand and rollers (11, 12) are provided on at least some chain links of the lower strand and/or the upper strand, which roll on running surfaces (16) provided on the chain links of the opposite strand when the energy guiding chain is traversed, it is envisaged, in order to guarantee very quiet running, that the axis of rotation of each of the rollers (11, 12) coincides with the pivoting axis of the adjacent pair (4) of side straps (5, 6).

14 Claims, 6 Drawing Sheets

FOREIGN PATENT DOCUMENTS

| | | |
|---|---|---|
| FR | 2 723 627 | 2/1996 |
| FR | 2 875 065 | 3/2006 |
| GB | 1444307 | 7/1976 |
| JP | 60125441 | 7/1985 |
| WO | 9957457 | 11/1999 |
| WO | 2005/108820 | 11/2005 |

OTHER PUBLICATIONS

PCT Search Report dated Sep. 6, 2007 received in corresponding International Application No. PCT/DE07/00677, 4 pgs.

German Search Report dated Aug. 10, 2007, received in related German Application No. 20 2006 006 638.1, 4 pgs.

International Search Report and Written Opinion dated Jul. 27, 2007, received in related International Application No. PCT/DE2007/000674, 12 pgs.

ENERGY GUIDING CHAIN

The invention relates to an energy guiding chain according to the generic part of the main Claim.

Energy guiding chains of this kind are known, for example, from DE 19919076 A1 and DE 4313075 A1. They generally consist of two strands of side straps, connected to each other in such a way that they can be pivoted relative to each other, and of two or more cross-members, each of which connects two side straps in the two strands, forming a chain link. The side straps can either be different, in which case largely plane inner straps alternate with outer straps in a strand, or they can be identical and, for example, each display an outwardly cranked and an inwardly cranked area. In operation, the energy guiding chain containing supply lines is fastened to a stationary supply source at one end, and to a mobile consumer at the other, and can be traversed in such a way that it forms a lower strand and an upper strand partly sliding thereon, the two being connected in a loop via a deflection zone. Desirable characteristics of the energy guiding chain in this context are very quiet running and little friction loss during traversing.

The quiet running of the energy guiding chain can be improved if as many chain links as possible are fitted into a given length, i.e. the chain links are designed to be as short as possible. GB 1444307 discloses an energy guiding chain where a supporting surface is assigned to individual chain links and oriented in such a way that, together with the other supporting surfaces, it forms a plane on the inner side of the loop. Certain chain links are provided with rollers, the peripheral surface of which projects beyond the supporting surface, and which roll on the opposite supporting surface when the upper strand is traversed on the lower strand. WO 99/57457 A1 proposes that the peripheral surfaces of these rollers be provided with a guide profile in the form of circumferential grooves, with crests between them that engage the grooves of the opposite rollers and can prevent uncontrolled lateral offsetting of the upper strand.

However, mounting the rollers on the chain links increases the length of the chain links. An energy guiding chain of this kind does not run as quietly. If only the chain links without rollers are designed shorter than the roller-bearing chain links, the result is uneven traversing motion of the energy guiding chain during lowering and lifting, as well as increased noise generation.

The object of the present invention is to indicate an energy guiding chain with rollers that displays very quiet running and can be traversed evenly and with a minimum of noise generation.

The object is solved by an energy guiding chain according to the main Claim.

The solution according to the invention makes it possible that the one area of a side strap, which displays the roller and can be connected to the adjacent side strap in pivoting fashion, is immediately adjacent to the other area, which can be connected to the adjacent side strap on the other side, or even overlaps it. This makes it possible to match the length of the roller-bearing chain links to the length of the other chain links, as a result of which even running with little noise generation is achieved, and the quietness of running of the chain can be varied over a wider range by selecting the chain link length. This embodiment is preferred, although the invention can also be executed with a more or less differing length of the roller-bearing chain links.

In an embodiment according to the invention, the rollers are mounted on the outside of the side straps, where the sides of the side straps on the inside of the loop are provided with wider areas as running surfaces for the rollers. This resembles the embodiment shown in WO 99/57457 A1, but the rollers are mounted in such a way that their axis of rotation coincides with the pivoting axis of a pair of side straps. Alternatively, the rollers can advantageously be integrated on the inside of the side straps, where the narrow faces of the straps serve as running surfaces.

The side strap strands of the energy guiding chain according to the invention preferably predominantly consist of mutually identical straps, each of which displays an outwardly cranked area and an inwardly cranked area (seen from the chain link). When assembling the chain, the inwardly cranked area of one strap is then placed on the outwardly cranked area of the next strap, and the two are connected to each other in pivoting fashion, e.g. by means of a pivot pin inserted into a receptacle. If side straps with rollers are now to be integrated in a strand of this kind, it is advantageous to also adapt the design of the area of the next strap to be connected to the roller-bearing area, such that a roller-bearing side strap pair for integration in the side strap strand is obtained. The end areas of this side strap pair are then again designed so that they can be connected, for example, to the inwardly or outwardly cranked area of the mutually identical straps.

Accordingly, a side strap pair of this kind preferably consists of a first side strap, displaying an area that can be connected to a rollerless side strap and a tongue bearing at least one roller, and of a second side strap, displaying an area that can be connected a rollerless side strap and a guide area. In this context, the tongue can be connected to the guide area in such a way that both side straps can be pivoted about an axis that coincides with the axis of the roller.

The areas of the first and second side strap that can be connected to the rollerless side straps preferably complement each other. A side strap pair of this kind can then also be integrated in an existing strand of the mutually identical side straps described above.

The guide area of the second side strap is preferably formed by one or two cheeks that, for example, extend as a continuation of the side surfaces of the second side strap and leave an interior space free. The cheeks can accommodate means for connecting the tongue to them in pivoting fashion. These means can, for example, be pins or the like, provided on the tongue. Preferably, circular openings are provided in the cheeks, into which disks can be inserted and fastened, e.g. screwed, to the tongue. For further stabilization, these disks can display a flange on the outer face end that rests on the outside of the cheek.

Furthermore, the guide area is preferably formed by two cheeks, between which the tongue with the at least one roller can be inserted, such that part of the peripheral area of the roller projects from the guide area.

Rollers are advantageously fitted on both sides of the tongue. The roller pairs thus formed border a guide groove between them that serves the lateral guidance of the upper strand. In this context, fastening on the tongue is preferably achieved by slipping onto pins on the tongue. Particularly preferably, the rollers are mounted in ball bearings.

In the energy guiding chain according to the invention, the pivoting axis for adjacent side straps is advantageously located asymmetrically, such that it is closer to the running surface than to the opposite narrow face of the side straps.

The invention will now be described in more detail on the basis of practical examples and the appended drawings.

Figure 1:
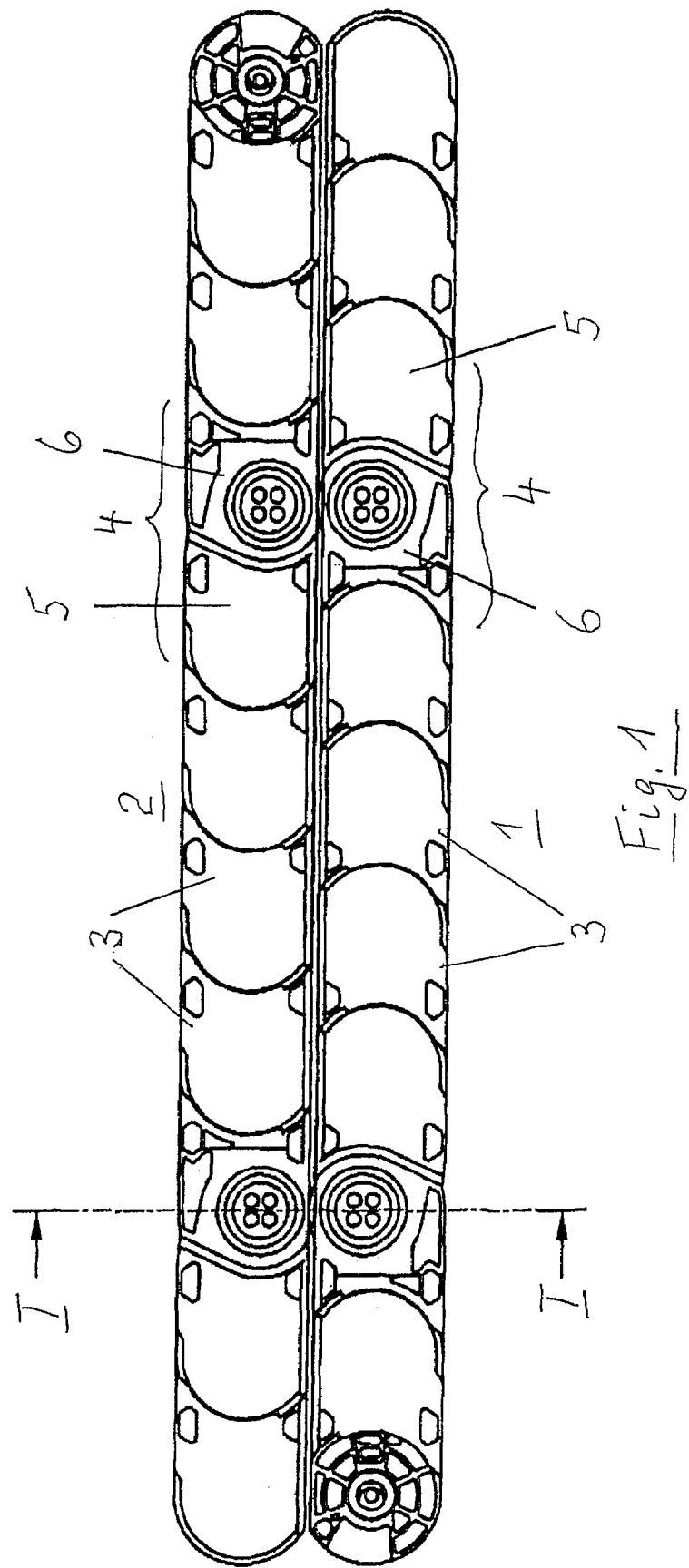
FIG. 1 shows a partial section of an energy guiding chain according to the invention with an upper strand and a lower strand, in a view of a side strap strand from the outside.

FIG. 1 shows a section of an energy guiding chain according to the invention with lower strand 1 and upper strand 2, in a view of the outer side of one of the side strap strands. The strand predominantly consists of mutually identical side straps 3. Integrated are roller-bearing side strap pairs 4, which consist of first side straps 5 and second side straps 6.

Figure 2:
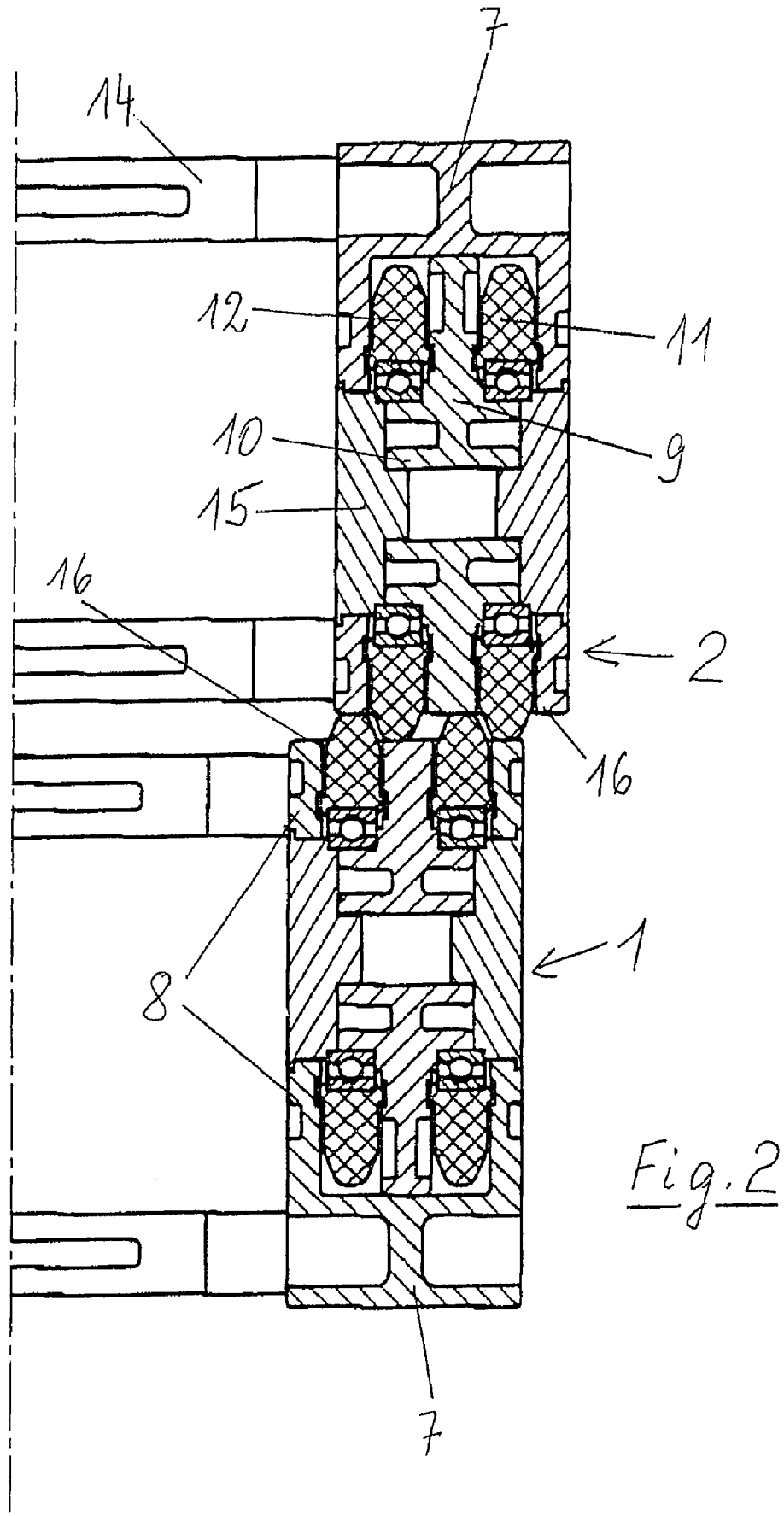
FIG. 2 shows section I-I through the side strap strand in FIG. 1.

The sectional drawing in FIG. 2 corresponds to an operating state in which the rollers of lower strand 1 and upper strand 2 are precisely above each other. Guide area 7 of the second side strap of the roller-bearing side strap pair extends into two cheeks 8, between which tongue 9 of the first side strap is inserted. This is designed with pins 10 on both sides, onto which ball bearing-mounted rollers 11, 12 are fitted. Their peripheral area projects from running surface 16, and they roll on the opposite running surface. Tongue 9 is connected to guide area 7 in pivoting fashion by disks 15 fastened on the tongue. Cross-members 14 make the connection to the other side strap strand and, together with the two stands, form the space for accommodating the supply lines.

Figure 3:
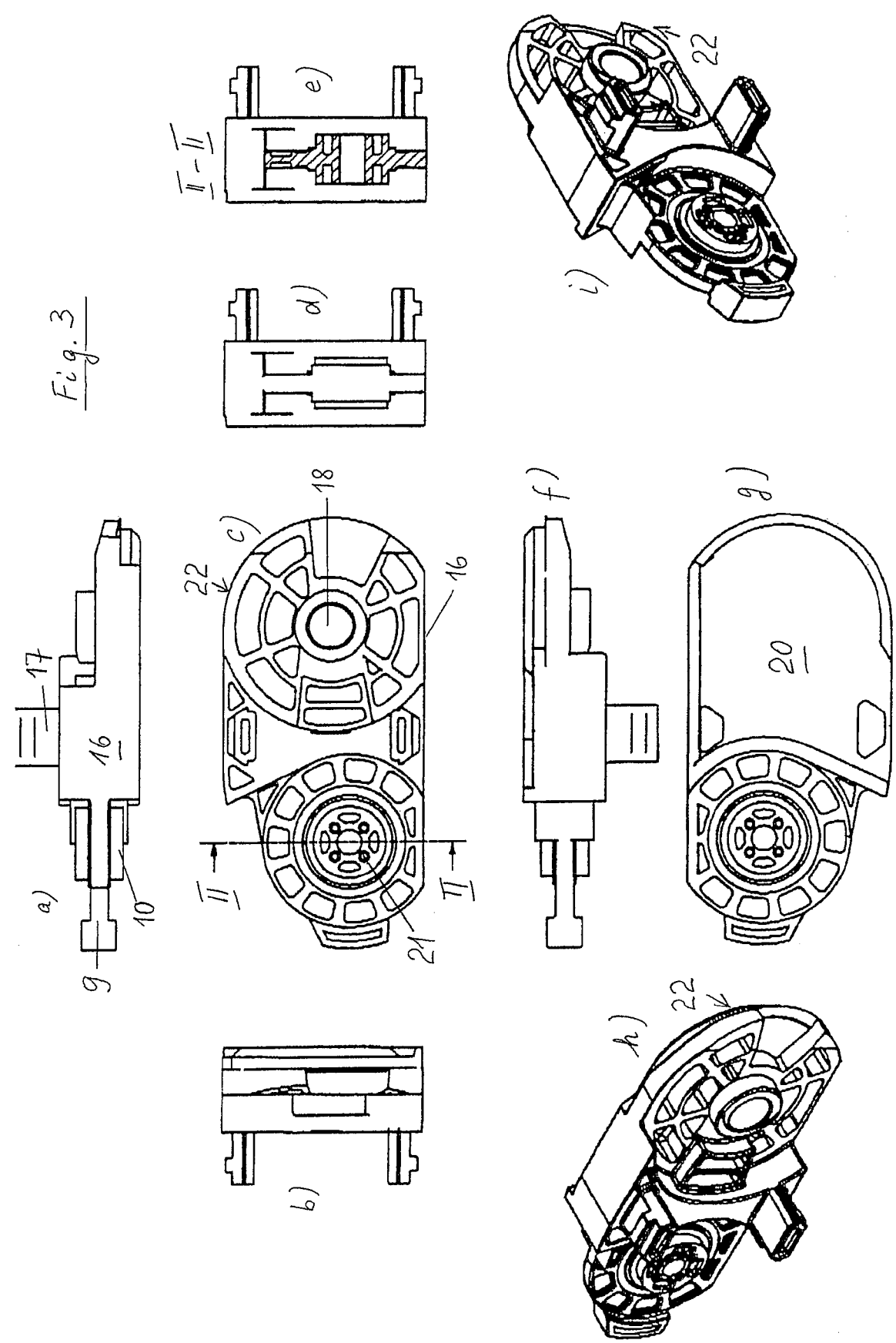
FIG. 3 shows a first side strap of a roller-bearing side strap pair, in views from six sides, as well as in a cross-section and two perspective views.

FIG. 3 shows the first side strap of the roller-bearing side strap pair as positioned in lower strand 1, in a top view (i.e. looking at running surface 16) a), rear view (i.e. from inside the chain link) c), bottom view f), front view g), left-side view b), right-side view d), section II-II e), and the rear perspective view to the left h) and right i). Tongue 9 with pins 10 serves to accommodate the rollers (not shown). Area 22 under outer surface 20 is used for connection to the other, mutually identical side straps by means of recess 18, which can accommodate a corresponding pivot pin. Holes 21 in pin 10 are provided for screws for fastening a disk not shown here. Cross-members 14 (FIG. 2) can be fitted on pins 17.

Figure 4:
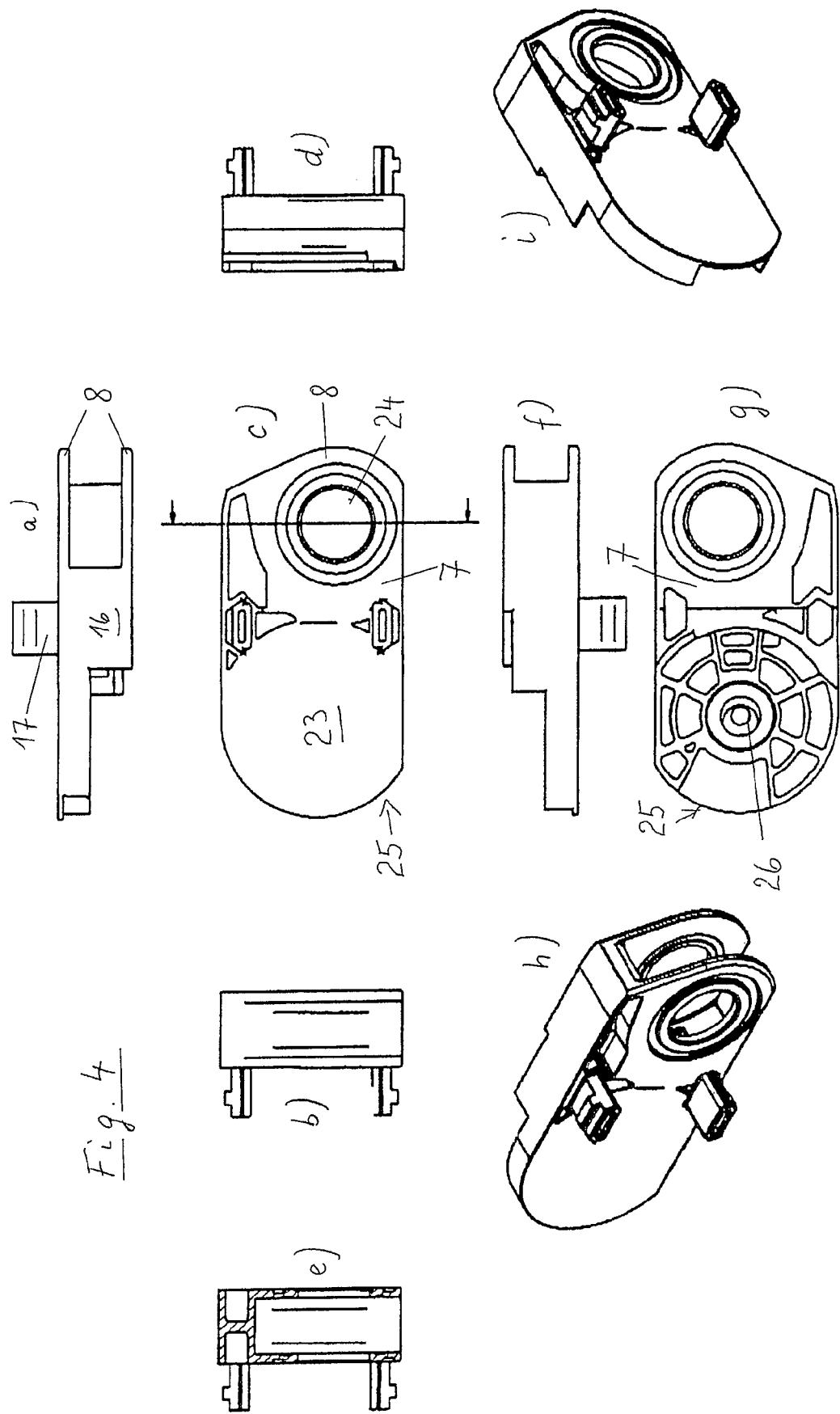
FIG. 4 shows a second side strap of a roller-bearing side strap pair, in views from six sides, as well as in a cross-section and two perspective views.

FIG. 4 shows the second side strap of the roller-bearing side strap pair as positioned in lower strand 1, in a top view (i.e. looking at running surface 16) a), rear view (i.e. from inside the chain link) c), bottom view f), front view g), left-side view b), right-side view d), section II-II e), and the rear perspective view to the left h) and right i). Guide area 7 extends into cheeks 8, which are provided with openings 24 to accommodate the fastening disk not shown here. Connecting area 25 is in this instance provided with a pivot pin 26 in the middle, which can be accommodated in a recess of an adjacent side strap corresponding to recess 18 (FIG. 3). Connecting area 25 on the second side strap is thus complementary to connecting area 22 on the first side strap. Smooth outer surface 23 of the connecting area faces the inside of the chain link here.

Figure 5:
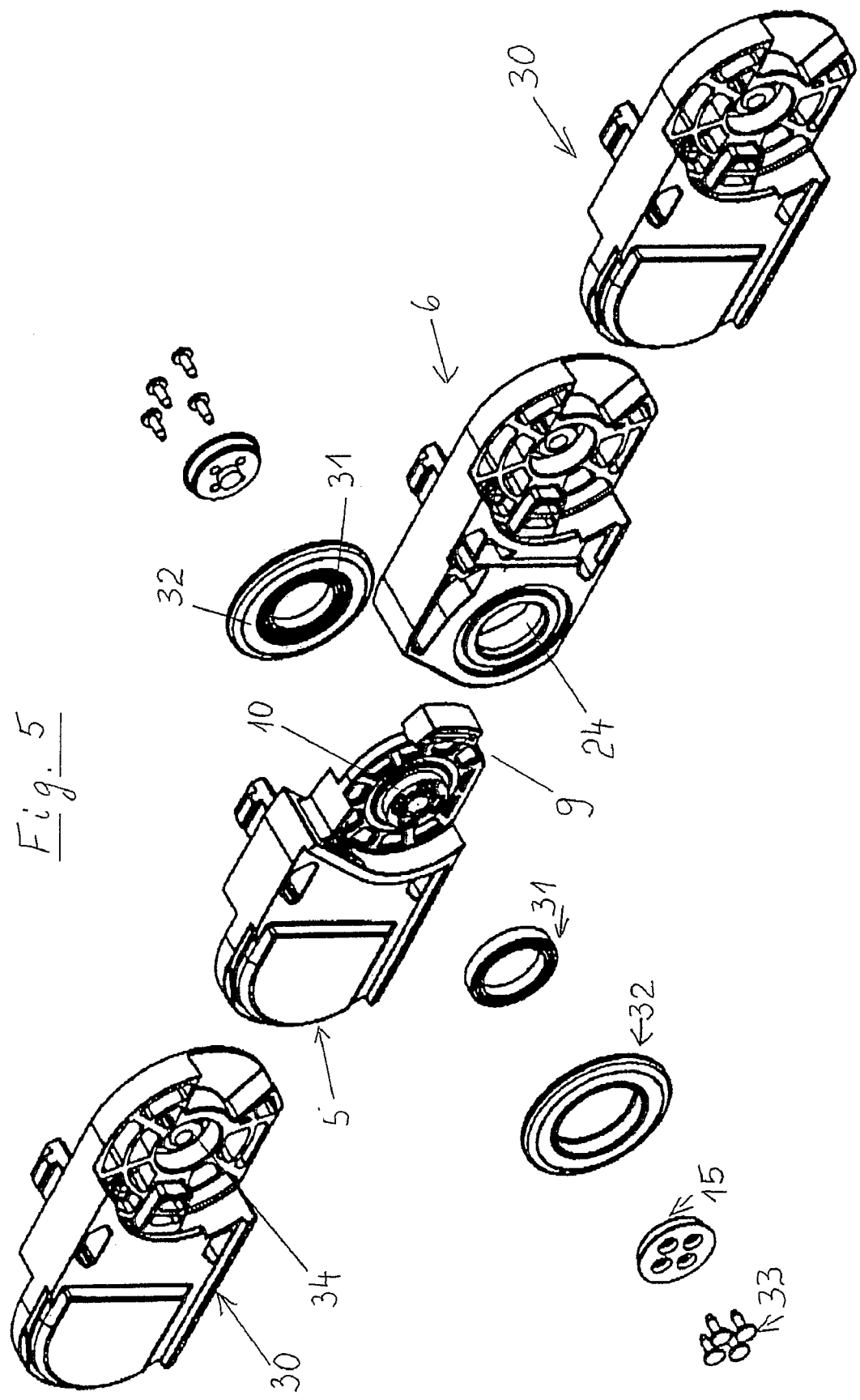
FIG. 5 shows an exploded drawing of a roller-bearing side strap pair and the side straps adjacent in the strand.

FIG. 5 shows an exploded drawing of the roller-bearing side strap pair, comprising first and second side strap 5 and 6, and, on its two ends, of two adjacent straps 30 of a side strap strand of the energy guiding chain according to the invention. Fitted on pins 10 on tongue 9 of first side strap 5 are rollers 32, which are provided with ball bearings 31. Accordingly, tongue 9 is guided between cheeks 8 on second side strap 6, and first side strap 5 is mounted on second side strap 6 in pivoting fashion by means of disks 15, which are inserted into opening 24 and screwed tight on tongue 9 with screws 33.

Figure 6:
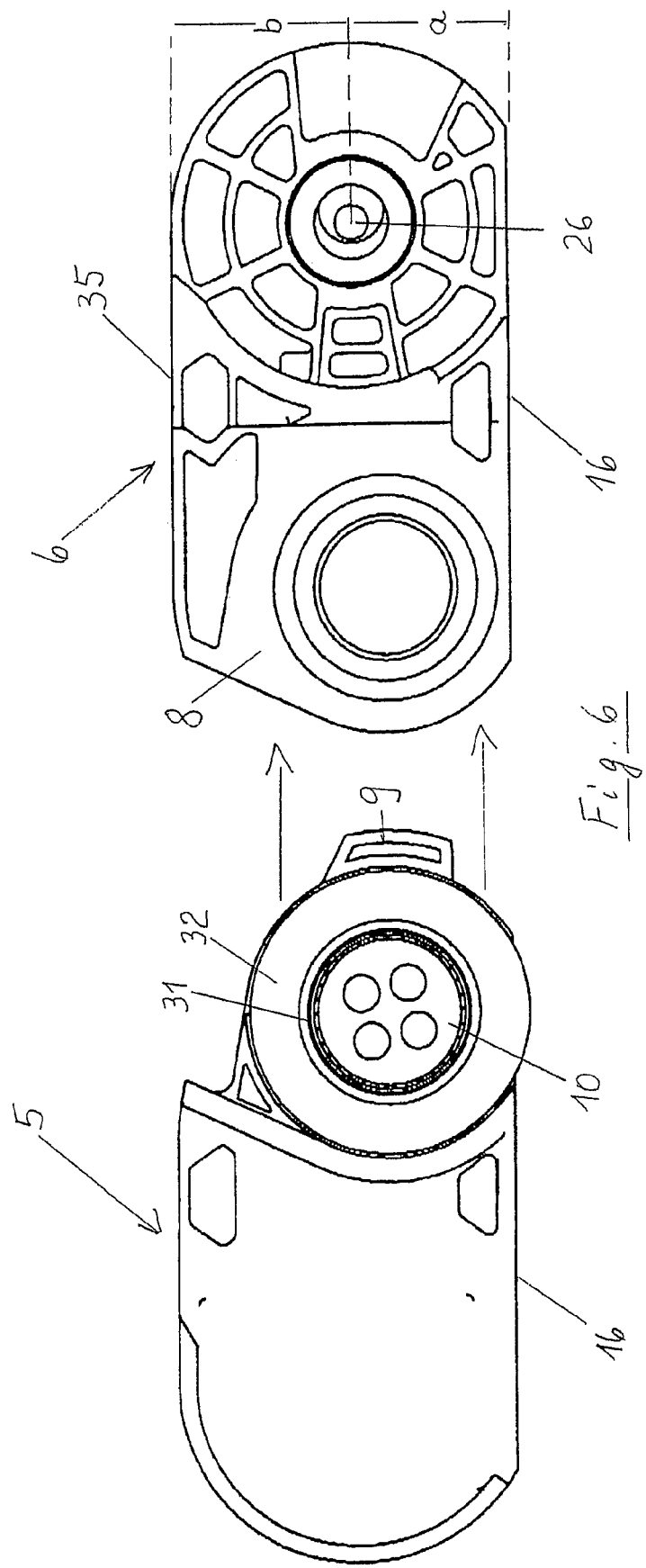
FIG. 6 shows the insertion of the first side strap into the second side strap.

FIG. 6 shows the orientation of the first and second side straps 5 and 6 prior to insertion of tongue 9 between cheeks 8, after fitting of rollers 32 with ball bearings 31 on pins 10. This Figure also clearly illustrates the asymmetrical position of pivot pin 26, whose axis is the pivoting axis between second side strap 6 and adjacent strap 30 (FIG. 5), in relation to narrow faces 16 and 35 of the side strap strand. Pivot pin 26 is closer to the narrow face with running surface 16 than to opposite narrow face 35 (a<b). The result of this is that running surfaces 16 of adjacent side straps do not obstruct each other during pivoting.

LIST OF REFERENCE NUMBERS

1 Lower strand
2 Upper strand
3 Mutually identical side straps
4 Side strap pair
5 First side strap
6 Second side strap
7 Guide area
8 Cheek
9 Tongue
10 Pin
11, 12 Rollers
14 Cross-member
15 Disk
16 Running surface
17 Pin for cross-member
18 Recess for pivot pin
20 Outer surface
21 Hole for screw
22 Connecting area
23 Outer surface
24 Opening
25 Connecting area
26 Pivot pin
30 Side strap
31 Ball bearing
32 Roller
33 Screw
34 Pivot pin
35 Narrow face of side strap

The invention claimed is:

1. Energy guiding chain for guiding hoses and cables comprising,
 a number of chain links connected to each other in articulated fashion that are formed by mutually parallel side straps, said side straps having an inside and a narrow face are connected to form parallel side strap strands, said chain links having a length and an outer side;
 and cross-members connecting said side strap strands, where the side straps can be pivoted relative to each other about a pivoting axis common to two adjacent side straps, where the energy guiding chain can be traversed in such a way that it forms an upper strand, a lower strand, the upper and lower strand being connected in a loop via a deflection zone, said loop having an inside and where the upper strand lies on the lower strand,
 and where rollers are provided on at least some chain links of the upper strand and/or the lower strand, these rollers being arranged in such a way that they roll on running surfaces provided on the chain links of the opposite strand when the energy guiding chain is traversed, said rollers including an axis of rotation;

characterized in that the axis of rotation of each of the rollers coincides with said pivoting axis of said two adjacent side straps.

2. Energy guiding chain according to claim 1, characterized in that some of said chain links are rollerless and the chain links provided with rollers have the same length as the rollerless chain links.

3. Energy guiding chain according to claim 1, characterized in that the rollers are mounted on the outer side of the chain links, and in that said sides of the side straps on the inside of the loop are provided with wider areas as running surfaces for the rollers.

4. Energy guiding chain according to claim 1, characterized in that the rollers are integrated on the inside of the side straps.

5. Energy guiding chain according to claim 1, characterized in that the side strap strands predominantly consist of mutually identical straps, each of which includes a first connecting area and a second connecting area, and in that the straps are integrated in the strands.

6. Energy guiding chain according to claim 5, characterized in that the straps consist of
a first side strap including an area that can be connected to a rollerless side strap, and a tongue bearing at least one roller, and
a second side strap including an area that can be connected to a rollerless side strap, and a guide area, where the tongue can be connected to the guide area such that both side straps can be pivoted about an axis coinciding with the axis of the roller.

7. Energy guiding chain according to claim 6, characterized in that the areas of the first and second side strap complement each other.

8. Energy guiding chain according to claim 6, characterized in that the guide area consists of one or two cheeks, which can accommodate means for connecting the tongue in pivoting fashion.

9. Energy guiding chain according to claim 8, characterized in that the tongue can be inserted between two cheeks, where the at least one roller partly projects from the guide area.

10. Energy guiding chain according to claim 6, characterized in that two rollers are present, being attached on both sides of the tongue.

11. Energy guiding chain according to claim 6, characterized in that the at least one roller is fitted on pins on the tongue.

12. Energy guiding chain according to claim 6, characterized in that the at least one roller is mounted in ball bearings.

13. Energy guiding chain according to claim 7, characterized in that the means for connecting the tongue are disks that can be inserted in a corresponding opening in the cheek and fastened on the tongue.

14. Energy guiding chain according to claim 1, characterized in that the pivoting axis for the adjacent side straps is closer to the running surface than to the narrow face of the side straps opposite the running surface.

* * * * *